May 12, 1964 J. P. JOHANNIGMAN 3,132,378
RELEASABLE STOP DEVICE FOR PRESSES AND THE LIKE
Filed Sept. 6, 1962
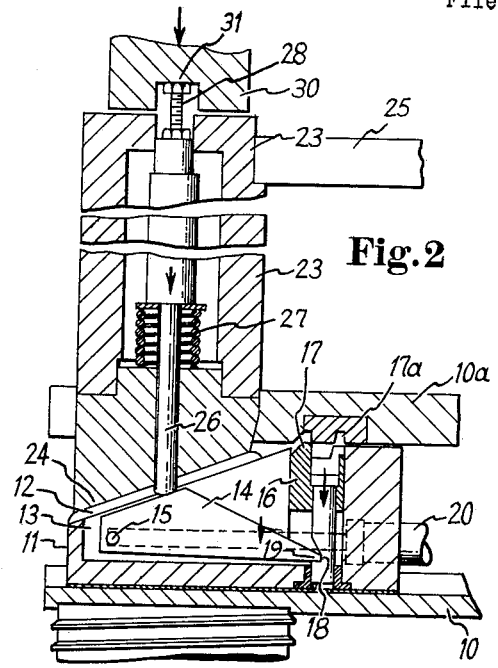
Fig.2
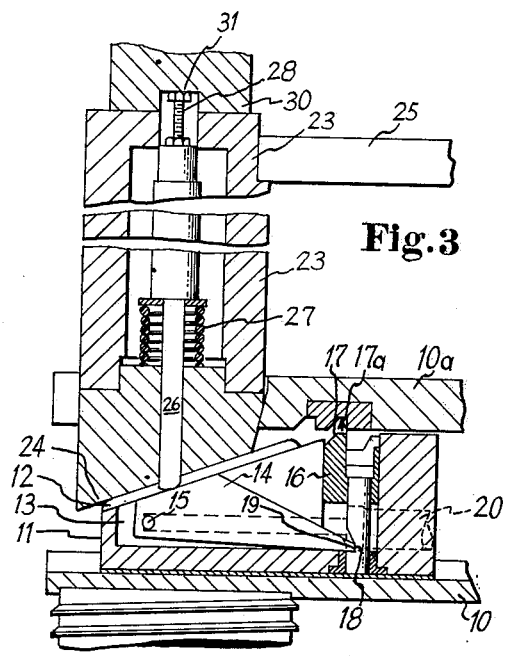
Fig.3
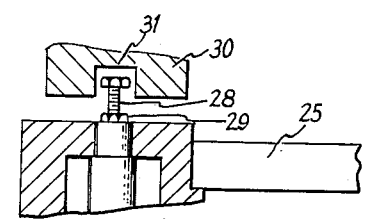
Fig.1
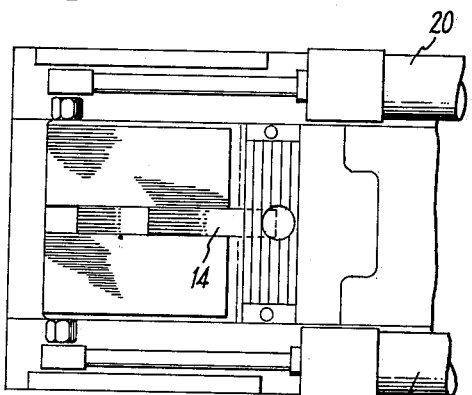
Fig.4
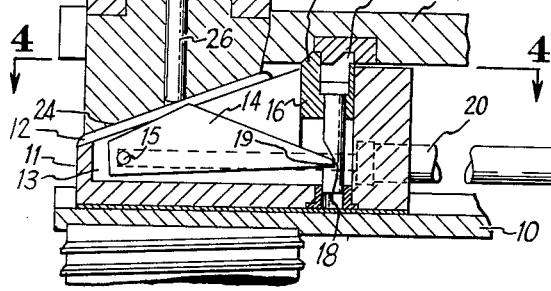
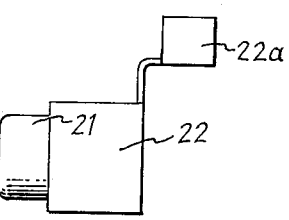
INVENTOR.
JEROME PAUL JOHANNIGMAN
BY
ATTORNEYS United States Patent Office 3,132,378
Patented May 12, 1964

3,132,378
RELEASABLE STOP DEVICE FOR PRESSES
AND THE LIKE
Jerome Paul Johannigman, Cincinnati, Ohio, assignor to
The Cincinnati Shaper Company, Cincinnati, Ohio, a
corporation of Ohio
Filed Sept. 6, 1962, Ser. No. 221,841
6 Claims. (Cl. 18—16)

This invention relates to releasable stops for presses and the like and more particularly to a stop which is particularly useful in compacting presses. In certain types of compacting presses where powdered or comminuted material (including, without limitation such materials as carbides, ceramics, ferrites, abrasives, solid fuels and nuclear fuels) is compacted, a stop is provided to resist the thrust of the ram during the compacting or molding operation and this stop must then be released to permit the ram to continue its travel in an operation designed to eject the molded part from the die or dies in which it is molded.

The problem in such a device is that the stop must be extremely rigid and strong in order to withstand the thrust during the molding step but it must be very quickly and easily releasable to permit the stop to be removed for the ejection operation.

In the past it has been the practice to resist the molding pressure with a pressure-held stop which yields, or is cammed aside, when the molding pressure exceeds the stop holding pressure. In other words, the stop is withdrawn while it is resisting the molding pressure. With such an arrangement it is clear that the stop cannot sustain the full load of the press because the stop will yield before full load can be attained. Furthermore, under such conditions the point at which the stop is released cannot be accurately controlled with respect to the stroke of the cam, and the stop easily becomes fouled with the comminuted material being compacted, and if this is abrasive, is subjected to excessive wear, resulting in further inaccuracies.

With the foregoing considerations in mind, it is an object of the present invention to provide a stop having a rigidly fixed stop position, and which will be of sufficient strength and rigidity to withstand the required molding pressure but which may be quickly and easily released to permit further movement of the ram for ejection. It is another object of the invention to provide such a stop which upon withdrawal of the ram is quickly and easily restored to its original condition to withstand the thrust of a succeeding molding operation.

It is another object of the invention to provide a stop mechanism wherein the stop release is triggered independently of compacting pressure, on the basis of the movement of a press part, so that the point of latch release can be very accurately controlled.

These and other objects of the invention which will be described in more detail hereinafter or which will be apparent to one skilled in the art upon reading these specifications are accomplished by that certain construction and arrangement of parts of which the following discloses an exemplary embodiment.

Reference is made to the drawings forming a part hereof and in which:

FIGURE 1 is a cross-sectional view taken on the line 1—1 of FIG. 4 showing the construction of the stop and its release mechanism in the effective position.

FIGURE 2 is a view similar to FIG. 1 showing the position of the parts at the instant of release of the stop.

FIG. 3 is a view similar to FIGS. 1 and 2 showing the wedge block being cammed aside; and FIG. 4 is a cross-sectional view taken on the line 4—4 of FIG. 1.

The stop mechanism of the present invention is particularly useful and has been designed particularly for use in a compacting press, which may be as disclosed and claimed in the copending application of Byron B. Belden, Serial No. 221,840, filed September 6, 1962. The details of the press do not form a part of the present invention and will therefore not be described. Basically I provide a stop rod which in a molding press may be secured to the platen or platens and I provide the stop rod with a sloping bottom surface. The stop itself is formed as a wedge block with a complementary sloping surface against which the bottom sloping surface of the rod bears. The wedge block is adapted to slide in guides at right angles to the axis of the stop rod and latch means are provided to hold it against such sliding movement. Associated with the stop rod is a trigger rod which may be actuated by an ejector rod which in the press described in said copending application may be secured to the uppermost platen. The trigger rod is arranged to operate against a trigger to withdraw the latching mechanism so that as a result of the coaction of the sloping surfaces, the wedge block may be cammed aside along the guides mentioned above. The wedge block is secured to the piston of a pneumatic cylinder or the like so that in its lateral movement it causes fluid to be compressed in the piston so that upon return of the stop rod to its uppermost position, the expansion of the fluid in said cylinder returns the wedge block to its initial position whereupon the latch mechanism is again rendered effective.

Referring more in detail to the drawings, guides for the wedge block are indicated generally at 10 and the wedge block itself is indicated at 11. The wedge block has the sloping upper surface formed by a bronze shoe or the like 12 and is provided with a central recess 13 in which a trigger 14 is pivotally mounted by means of a pin or the like at 15.

Also mounted in the wedge block is a latch member 16 having one or more teeth 17 and this latch member may move vertically in the wedge block. The wedge block is provided with a notch 18 engaged by a finger portion 19 of the trigger 14.

The upper guide 10a is provided with a complementary tooth configuration 17a with which the teeth 17 may engage as shown in FIG. 1.

Also secured to the wedge block is the piston rod 20 secured to the piston 21 operating in the cylinder 22.

The stop rod proper is indicated at 23 and is provided with the sloping bottom surface 24 which is complementary to the surface 12 described above. Indicated diagrammatically at 25 is a platen or other structure with which the stop rod moves.

Within the stop rod there is provided the trigger rod 26 which is spring urged by means of the spring 27 to an inoperative position as shown in FIG. 1. An extension which may comprise a bolt 28 with a lock nut 29 is adapted to be contacted by the ejection rod 30, which may be thought of as secured to the uppermost platen or other desired part of the apparatus.

From this description, it will now be clear that as the ram of the press exerts its molding pressure, the stop mechanism remains in the condition of FIG. 1 and a wedge block 11 sustains the entire molding pressure. At the completion of the molding operation, which in the particular machine described in the copending application mentioned above occurs when the uppermost platen reaches a certain level, the ejection rod 30 which has the recess 31 abuts against the member 28 and as shown in FIG. 2 just before the ejection rod 30 abuts the stop rod 23, the trigger rod 26 is actuated to pivot the trigger 14 about its pivot point 15 in a clockwise direction. This action withdraws the latch member 16 and its teeth 17 from the mating teeth 17a so that the wedge block 11 is cammed to the right, as best seen in FIG. 3, with the surface 24 of the stop rod bearing against the complementary surface 12. As the wedge block 11 moves to the right, the piston 21 forces air or other suitable fluid in the cylinder 22 into a surge tank or reservoir 22a, so that when the stop rod 23 has completed its work and moved upward, the pressure in the surge tank 22a and the cylinder 22, acting on the piston 21, returns the wedge block and associated parts to the position of FIG. 1 with the teeth 17 again engaging with the teeth 17a, so that the parts are in position for a succeeding operation.

It will be understood that while the invention has been described in some detail, numerous modifications may be made without departing from the spirit thereof. Similarly, while it has been described as having particular utility in connection with a multiple platen molding press, as described in said copending application, it may be used in any situation where it is required that a stop withstand heavy pressure during a certain portion of movement of a machine element and that it then be released to permit further movement of such machine element.

Having now fully described the invention, what is claimed as new and what it is desired to secure by Letters Patent is:

1. In a compacting press and the like, wherein a platen must be securely supported to withstand the molding pressure, and then must be released for ejection of a molded part after a predetermined amount of movement of another part of said press, a stop rod secured to said platen and having a sloping lower surface, a wedge block having a complementary sloping upper surface and arranged for lateral movement under pressure from said stop rod, guide means along which said wedge block may move laterally, a fixed latch element secured to said guide means, a retractable latch element mounted in said wedge block, means for urging said retractable latch element into engagement with said fixed latch element, a slot in said wedge block, a lever pivotally mounted in said slot and having a finger engaging said retractable element, a trigger rod mounted in said stop rod and adapted to actuate said lever, and an ejector rod secured to said other part of said press and adapted to actuate said trigger rod just before it abuts said stop rod, whereby said stop rod in engagement with said wedge block can sustain the molding pressure, and whereby upon said ejector rod actuating said trigger said latch is withdrawn, so that said stop rod may move while said wedge block is cammed laterally.

2. A device according to claim 1, wherein yieldable means are provided to urge said wedge block to latching position.

3. A device according to claim 1, wherein a fluid cylinder is mounted on said guide means, and a piston operating in said cylinder is secured to said wedge block, said cylinder being connected to a source of pressure, upon retraction of said stop rod, said source of pressure returns said wedge block to its original position.

4. In a press and the like wherein a stop must withstand high pressure during a predetermined amount of movement of a press part and then must be released to permit further movement of said part, a stop rod secured to said part which must resist high pressure, said stop rod having a sloping lower surface, a wedge block having a complementary sloping upper surface and arranged for lateral movement under pressure from said stop rod, guide means along which said wedge block may move laterally, latch means mounted in said wedge block for latching said wedge block in position in said guide means, a trigger mounted in said wedge block and connection to said latch means for retracting the same, a trigger rod mounted in said stop rod and adapted to actuate said retracting means and a second rod secured to a press part which must continue its movement after release of the wedge block and adapted to actuate said trigger rod just before it abuts said stop rod, whereby said stop rod in engagement with said wedge block can sustain said high pressure, and whereby upon said second rod actuating said trigger said latch means is unlatched so that said stop rod may move while said wedge block is cammed laterally.

5. A device according to claim 4, wherein yieldable means are provided to urge said wedge block to latching position.

6. A device according to claim 4, wherein a fluid cylinder is mounted on said guide means, and a piston operating in said cylinder is secured to said wedge block, said cylinder being connected to a source of pressure, upon retraction of said stop rod, said source of pressure returns said wedge block to its original position.

References Cited in the file of this patent

UNITED STATES PATENTS

| | | |
|---|---|---|
| 2,319,479 | Ryder | May 18, 1943 |
| 2,389,169 | Stacy | Nov. 20, 1945 |
| 2,483,094 | Harvey | Sept. 27, 1949 |
| 2,494,777 | Patterson et al. | Jan. 17, 1950 |
| 3,004,291 | Schad | Oct. 17, 1961 |